United States Patent
Hightower, III et al.

(10) Patent No.: US 10,053,801 B2
(45) Date of Patent: Aug. 21, 2018

(54) SHEATH AND CORE YARN FOR THERMOPLASTIC COMPOSITE

(71) Applicant: Inman Mills, Inman, SC (US)

(72) Inventors: William C. Hightower, III, Spartanburg, SC (US); Norman H. Chapman, Spartanburg, SC (US)

(73) Assignee: Inman Mills, Inman, SC (US)

( * ) Notice: Subject to any disclaimer, the term of this patent is extended or adjusted under 35 U.S.C. 154(b) by 443 days.

(21) Appl. No.: 14/600,049

(22) Filed: Jan. 20, 2015

(65) Prior Publication Data

US 2015/0211154 A1 Jul. 30, 2015

Related U.S. Application Data (60) Provisional application No. 61/932,281, filed on Jan. 28, 2014.

(51) Int. Cl.
| | | |
|---|---|---|
| *D02G 1/02* | (2006.01) | |
| *D02G 3/40* | (2006.01) | |
| *D02G 3/36* | (2006.01) | |

(52) U.S. Cl.
CPC ............ *D02G 1/0286* (2013.01); *D02G 3/36* (2013.01); *D02G 3/402* (2013.01); *D10B 2401/041* (2013.01); *Y10T 428/249921* (2015.04); *Y10T 428/2929* (2015.01)

(58) Field of Classification Search
None
See application file for complete search history.

(56) References Cited

U.S. PATENT DOCUMENTS

| | | | |
|---|---|---|---|
| 2,999,835 A | 9/1961 | Goldberg | |
| 3,038,365 A | 6/1962 | Peterson | |
| 3,153,008 A | 10/1964 | Fox | |
| 3,334,154 A | 8/1967 | Kim | |
| 3,847,867 A | 11/1974 | Heath et al. | |

(Continued)

FOREIGN PATENT DOCUMENTS

| | | |
|---|---|---|
| DE | 3408769 A1 | 9/1985 |
| EP | 0133893 A2 | 3/1985 |

(Continued)

OTHER PUBLICATIONS

Paper by Wakeman et al., entitles "Void Evolution During Stamp-Forming of Thermoplastic Composites," presented at 15th International Conference on Composite Materials (ICCM-15) in Durban, South Africa from Jun. 27 to Jul. 1, 2005, 12 pages.

(Continued)

*Primary Examiner* — Laura C Powers
(74) *Attorney, Agent, or Firm* — Dority & Manning, P.A.

(57) ABSTRACT

A yarn containing a core of continuous filaments of an inorganic material and a sheath of staple fibers of a thermoplastic polymer is provided. The yarn can be formed into a fabric or unidirectional tape, which can then be heated under pressure to form a composite material that has excellent mechanical strength yet is lightweight. The fabric can be molded into a composite material having a two-dimensional or three-dimensional shape because of its excellent drapability. The composite material can be used in aircraft parts, automotive parts, marine parts, consumer electronic parts, and other products.

9 Claims, 3 Drawing Sheets

(56) References Cited

U.S. PATENT DOCUMENTS

| | | |
|---|---|---|
| 3,972,902 A | 8/1976 | Heath et al. |
| 4,001,184 A | 1/1977 | Scott |
| 4,107,909 A | 8/1978 | Fehrer et al. |
| 4,123,436 A | 10/1978 | Holub et al. |
| 4,131,575 A | 12/1978 | Adelmann et al. |
| 4,225,442 A | 9/1980 | Tremblay et al. |
| 4,455,410 A | 6/1984 | Giles, Jr. |
| 4,650,850 A | 3/1987 | Howson |
| 4,794,157 A | 12/1988 | Berdahl et al. |
| 4,816,527 A | 3/1989 | Rock |
| 4,820,781 A | 4/1989 | Policastro et al. |
| 4,855,391 A | 8/1989 | Berdahl et al. |
| 4,921,756 A | 5/1990 | Tolbert et al. |
| 4,927,698 A | 5/1990 | Jaco et al. |
| 5,033,262 A | 7/1991 | Montgomery et al. |
| 5,420,180 A | 5/1995 | Katayama et al. |
| 5,540,980 A | 7/1996 | Tolbert et al. |
| 5,568,719 A | 10/1996 | Proctor |
| 5,910,361 A | 6/1999 | Guevel et al. |
| 6,287,686 B1 | 9/2001 | Huang et al. |
| 6,287,690 B1 | 9/2001 | Land |
| 6,410,140 B1 | 6/2002 | Land et al. |
| 6,553,749 B2 | 4/2003 | Land et al. |
| 6,606,846 B2 | 8/2003 | Land |
| 6,620,212 B1 | 9/2003 | Handermann et al. |
| 6,655,122 B2 | 12/2003 | Shigeyama et al. |
| 6,682,618 B1 * | 1/2004 | Bowers .................. D02G 3/402 156/72 |
| 6,720,058 B1 | 4/2004 | Weeks et al. |
| 6,764,764 B1 * | 7/2004 | Tam .......................... D01F 6/04 428/364 |
| 7,100,352 B2 | 9/2006 | Robins |
| 7,144,600 B2 | 12/2006 | DeMott |
| 7,682,997 B2 | 3/2010 | Altman et al. |
| 7,718,259 B2 | 5/2010 | Pollet et al. |
| 7,776,770 B2 | 8/2010 | Wang et al. |
| 7,841,162 B2 | 11/2010 | Coombs |
| 8,079,206 B2 | 12/2011 | Abbasi |
| 8,093,160 B2 | 1/2012 | Tharpe, Jr. et al. |
| 8,176,830 B1 | 5/2012 | Tan |
| 8,557,158 B2 | 10/2013 | Shen et al. |
| 8,720,174 B2 | 5/2014 | Kochmann |
| 8,734,925 B2 | 5/2014 | Kweder et al. |
| 2004/0002272 A1 | 1/2004 | Land |
| 2007/0049148 A1 | 3/2007 | Chien et al. |
| 2010/0048853 A1 | 2/2010 | Dris et al. |
| 2010/0086727 A1 | 4/2010 | Katayama et al. |
| 2010/0107551 A1 | 5/2010 | Berry et al. |
| 2010/0197184 A1 | 8/2010 | Browne et al. |
| 2010/0227115 A1 | 9/2010 | Esaki et al. |
| 2010/0239856 A1 | 9/2010 | Olson et al. |
| 2012/0077397 A1 | 3/2012 | Porter |
| 2012/0107551 A1 | 5/2012 | Fang et al. |
| 2012/0137649 A1 * | 6/2012 | Kochmann ............... D02G 3/46 57/211 |
| 2012/0220179 A1 | 8/2012 | Nakase et al. |
| 2013/0040523 A1 | 2/2013 | Takahashi et al. |
| 2013/0260125 A1 | 10/2013 | Ordonez et al. |
| 2013/0306186 A1 | 11/2013 | Goulet |
| 2014/0094077 A1 | 4/2014 | Goulet |

FOREIGN PATENT DOCUMENTS

| | | |
|---|---|---|
| EP | 0 305 094 A1 | 3/1989 |
| EP | 0 425 075 A1 | 5/1991 |
| GB | 2 105 247 A | 3/1983 |
| WO | WO 01/71073 A1 | 9/2001 |
| WO | WO 2006/029077 A2 | 3/2006 |
| WO | WO 2009/073543 A2 | 6/2009 |

OTHER PUBLICATIONS

International Search Report and Written Opinion for PCT/US2015/011953 dated Oct. 16, 2015, 14 pages.

* cited by examiner

SHEATH AND CORE YARN FOR THERMOPLASTIC COMPOSITE

RELATED APPLICATION

The present application claims priority to U.S. Provisional Application Ser. No. 61/932,281, filed on Jan. 28, 2014, which is incorporated herein in its entirety by reference thereto.

BACKGROUND OF THE INVENTION

Composite materials are materials made from two or more constituent materials, with different physical or chemical properties, that when combined, produce a material with characteristics different from the individual components. Combining the two or more constituent materials can result in a composite material that is stronger, lighter, or less expensive when compared to traditional materials. Such composite materials can be used to form aircraft parts, automotive parts, marine parts, consumer electronic parts, and other products where a lightweight yet strong material is desired.

Composite materials can be formed from the combination of a thermoplastic material and an inorganic material, such as fiberglass, by several different methods, such as by alternating layers of a fiberglass yarn fabric and a thermoplastic yarn fabric, weaving separate yarns of fiberglass and thermoplastic together in a fabric, by commingling a fiberglass yarn and a thermoplastic yarn to form a single yarn, or by dipping a fiberglass fabric in a solvent a containing a thermoplastic polymer. However, such methods, such as commingling, often result in poor flow and fiber wet out, which results in a composite that has excessive voids. This can lead to difficulty in filling air voids when the composite is formed, resulting in a weakened composite, as fiber wetout is important for obtaining good load transfer from the thermoplastic resin to the reinforcing fiberglass. Further, the use of solvents can lead to environmental and health concerns. As such, a need exists for a composite that exhibits improved properties compared to currently available composites and that can be formed with better flow and fiber wet out. A need also exists for a method for forming a composite that does not utilize a solvent based application system to alleviate environmental and health concerns.

SUMMARY OF THE INVENTION

In accordance with one embodiment of the present invention, a spun yarn is described that includes a core and a sheath. The core comprises from about 50 wt. % to about 90 wt. % of the spun yarn based on the total weight of the spun yarn, and the sheath comprises from about 10 wt. % to about 50 wt. % of the spun yarn based on the total weight of the spun yarn. In addition, the core includes continuous filaments of an inorganic material and the sheath includes staple fibers of a thermoplastic polymer.

In one embodiment, the inorganic material can include fiberglass, carbon, ceramic, quartz, or a combination thereof. In an additional embodiment, the thermoplastic polymer can include polyetherimide, polycarbonate, polypropylene, polyethylene, polyphenylene sulfide, polyethylene terephthalate, polybutylene terephthalate, polyethersulfone, polyetherketoneketone, polyetheretherketone, polyimide, or a combination thereof.

In still another embodiment, the staple fibers can have a length ranging from about 10 millimeters to about 75 millimeters. Meanwhile, the continuous filaments can be coated with a binder. Further, regardless of the materials used to form the spun yarn, the yarn can be corespun, ring spun, air jet spun, friction spun, or vortex spun. In one more embodiment, the yarn can be formed into a fabric or unidirectional tape. The fabric can be a knitted, woven, or braided fabric.

In yet another embodiment, the present disclosure is directed to a method for forming a spun yarn. The method includes introducing a core of continuous filaments into a yarn spinning apparatus, where the continuous filaments include an inorganic material; and introducing staple fibers into the yarn spinning apparatus, where the staple fibers include a thermoplastic polymer; and forming a sheath around the core of continuous filaments. The yarn spinning apparatus causes the staple fibers to wrap around the core of continuous filaments to form the sheath. Further, the core constitutes from about 50 wt. % to about 90 wt. % of the spun yarn and the sheath constitutes from about 10 wt. % to about 50 wt. % of the spun yarn based on the total weight of the spun yarn.

In one particular embodiment, the method further includes coating the continuous filaments with a binder before introducing the staple fibers.

In an additional embodiment, the inorganic material used in the method includes fiberglass, carbon, ceramic, quartz, or a combination thereof. Further, the staple fibers used in the method include polyetherimide, polycarbonate, polypropylene, polyethylene, polyphenylene sulfide, polyethylene terephthalate, polybutylene terephthalate, polyethersulfone, polyetherketoneketone, polyetheretherketone, polyamide, or a combination thereof.

In still another embodiment, the method contemplates a spun yarn that is corespun, ringspun, air jet spun, friction spun, or vortex spun.

In one more embodiment contemplated by the present disclosure, a composite material that includes a fabric that further includes a spun yarn is contemplated. The spun yarn includes a core of continuous filaments of an inorganic material and a sheath, of staple fibers of a thermoplastic polymer. The composite material is formed by the application of heat and pressure to the fabric.

In one particular embodiment, the inorganic material can include fiberglass, carbon, ceramic, quartz, or a combination thereof. In still another embodiment, the staple fibers can include polyetherimide, polycarbonate, polypropylene, polyethylene, polyphenylene sulfide, polyethylene terephthalate, polybutylene terephthalate, polyethersulfone, polyetherketoneketone, polyetheretherketone, polyamide, or a combination thereof.

In yet another embodiment, the core can constitute from about 50 wt. % to about 90 wt. % of the spun yarn based on the total weight of the spun yarn. Meanwhile, the sheath can constitute from about 10 wt. % to about 50 wt. % of the spun yarn based on the total weight of the spun yarn. Further, the staple fibers can have a length of from about 5 millimeters to about 75 millimeters. In addition, the yarn can be core spun, ring spun, air jet spun, friction spun, or vortex spun.

In still another embodiment of the present disclosure, a method for forming a composite material is disclosed. The method includes applying heat and pressure to a fabric to form a composite material, where the fabric comprises a yarn, where the yarn includes a core of continuous filaments of an inorganic material and a sheath of staple fibers of a thermoplastic polymer, where the heat applied has a temperature greater than the melting point of the thermoplastic polymer, and where the pressure applied ranges from about 50 psi to about 2000 psi.

In one particular embodiment, the yarn can be core spun, ring spun, air jet spun, friction spun, or vortex spun.

In still another embodiment, the continuous filaments can be coated with a binder. In yet another embodiment, the composite material can be shaped into a molded article by placing the fabric into a mold before applying heat and pressure.

In one more embodiment, the inorganic material can include fiberglass, carbon, ceramic, quartz, or a combination thereof. Meanwhile, the staple fibers can include polyetherimide, polycarbonate, polypropylene, polyethylene, polyphenylene sulfide, polyethylene terephthalate, polybutylene terephthalate, polyethersulfone, polyetherketoneketone, polyetheretherketone, polyamide, or a combination thereof. In one particular embodiment, the staple fibers can include polyetherimide and the heat applied can have a temperature ranging from about 200° C. to about 400° C. In still another embodiment, the staple fibers can include polycarbonate and the heat applied can have a temperature ranging from about 100° C. to about 275° C.

Other features and aspects of the present invention are discussed in greater detail below.

BRIEF DESCRIPTION OF THE DRAWING

A full and enabling disclosure of the present invention, including the best mode thereof, directed to one of ordinary skill in the art, is set forth more particularly in the remainder of the specification, including reference to the appended figures, in which.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. For the purposes of this application, like features will be represented by like numbers between the figures.

Generally speaking, the present disclosure is directed to a yarn, a fabric, and composite material that can be utilized in applications where a lightweight yet strong material is desired. By selectively controlling the materials utilized in the core and sheath components of the yarn, as well as the size and weight percentage of the core and sheath components, a composite having improved properties due to better flow and wetout is provided. For instance, the core is formed of continuous filaments of an inorganic material, while the sheath is formed of staple fibers of a thermoplastic material. Without intending to be limited by any particular theory, it is believed that the improved properties are due in part to the ability of the thermoplastic staple fibers of the sheath to be placed in very close proximity to the core continuous filaments. Further, once heated to form a composite, the core can remain intact as a woven grid structure to provide properties needed in the composite application, while the thermoplastic sheath is melted around the core. The fabric of the present disclosure also has excellent drapability so that, when forming a composite, the composite can be easily molded into a curved, three-dimensional shape, such as aircraft, marine, automotive, or electronic components. As a load is applied to the composite, the load is transferred from the melted thermoplastic staple fibers to the reinforcing core of inorganic continuous filaments.

Core

The core of the yarn contemplated by the present disclosure can include any suitable inorganic material. For instance, the core can include fiberglass, carbon, ceramic, quartz, or a combination thereof. Fiberglass composite is a fiber reinforced polymer made of a plastic matrix reinforced by fine fibers of glass. It is also known as GFK or FRS and is a lightweight, extremely strong, and robust material. The plastic matrix can be an epoxy, a thermosetting plastic (e.g., polyester or vinylester) or a thermoplastic. Meanwhile, carbon fibers are extremely strong, thin fibers made by pyrolyzing synthetic fibers, such as rayon, until charred. Ceramic fibers include small-dimension filaments or threads composed of a ceramic material, such as alumina or silica. However, in some embodiments, it is also to be understood that an organic material such as cellulose can be used in the core of the yarn.

The core can be in the form of one or more continuous filaments of the inorganic material, such as from about 1 to about 2000 filaments, such as from about 25 to about 1850 filaments, such as from about 50 to about 1700 filaments. The one or more filaments can each have a diameter ranging from about 1 micron to about 50 microns, such as from about 2 microns to about 40 microns, such as from about 3 microns to about 50 microns. Regardless of the specific number and type of continuous filaments utilized, the core of continuous filaments can be present in an amount ranging from about 50 wt. % to about 90 wt. %, such as from about 55 wt. % to about 85 wt. %, such as from about 60 wt. % to about 80 wt. % based on the total weight of the yarn.

In some embodiments, the core of the yarn can be coated with a binder prior to further processing to incorporate the sheath staple fibers into the yarn. The addition of the binder can enhance the attachment of the sheath staple fibers to the continuous filaments of the core of the yarn. The binder should be capable of withstanding temperatures of up to about 400° C. without degrading, as forming a composite from the fabric and yarn of the present disclosure may require heating the fabric to such a temperature. If the binder begins to degrade during forming of the composite, dark streaks would be formed in the composite, which results in an appearance that is not aesthetically pleasing. The binder can be applied to the core of continuous filament(s) in an amount ranging from about 0.1 wt. % to about 5 wt. %, such as from about 0.2 wt. % to about 2.5 wt. %, such as from about 0.25 wt. % to about 1 wt. % based on the total weight of the yarn.

Sheath

The sheath can include staple fibers formed from a thermoplastic material, such as polyetherimide, polycarbonate, polypropylene, polyethylene, polyphenylene sulfide, polyethylene terephthalate, polybutylene terephthalate, polyethersulfone, polyetherketoneketone, polyetheretherketone, polyamide, or a combination thereof. In some embodiments, the thermoplastic can be renewable or bio-based. For instance, polyamide 11, which is derived from vegetable oil, and biopolypropylene, which is derived from sugarcane, can be used as suitable thermoplastics in the yarn and composite materials of the present invention.

In one particular embodiment, the thermoplastic staple fiber can be a polyetherimide. The polyetherimide fiber can include structural units I:

(I)

wherein T is a divalent bridging group, selected from the group consisting of a bond, O, S, SO, CO, $SO_2$, a $C_1$-$C_{20}$ aliphatic radical, a $C_2$-$C_{20}$ cycloaliphatic radical, and a $C_2$-$C_{20}$ aromatic radical; and R1 is divalent radical selected from a $C_1$-$C_{20}$ aliphatic radical, a $C_2$-$C_{20}$ cycloaliphatic radical, or a $C_2$-$C_{20}$ aromatic radical. Typically, the divalent bridging group T may be attached to the aromatic rings of structural unit I at positions such as the 3,3'; 4,4'; 3,4'; or 4,3'.

In one embodiment, the divalent bridging group T can be a wherein Z is a $C_1$-$C_{20}$ aliphatic radical, a $C_2$-$C_{20}$ cycloaliphatic radical, or a $C_2$-$C_{20}$ aromatic radical. In another embodiment, Z comprises structural units II (II)

wherein Q includes but is not limited to a divalent moiety selected from the group consisting of is a $C_1$-$C_{12}$ aliphatic radical, a $C_3$-$C_{12}$ cycloaliphatic radical, a $C_4$-$C_{18}$ aromatic radical, —O—, —S—, —C(O)—, —$SO_2$—, —SO—, —$C_yH_{2y}$— (y being an integer from 1 to 8), and fluorinated derivatives thereof, for example perfluoroalkylene groups. Illustrative examples of the $C_yH_{2y}$ group include but are not limited to methylene, ethylene, ethylidene, propylene, and isopropylidene.

In some embodiments, the polyetherimide may be a copolymer. Mixtures of polyetherimides may also be employed. The polyetherimide can be prepared by any of the methods well known to those skilled in the art, including the reaction of an aromatic bis(ether anhydride) with an organic diamine. The polyetherimide fiber comprises structural units derived from a diamine and a bis(ether anhydride).

Examples of specific aromatic bis anhydrides and organic diamines are disclosed, for example, in U.S. Pat. Nos. 3,972,902 and 4,455,410 and U.S. Patent Application Publication No. 2010/0048853, which are incorporated herein by reference. Non-limiting examples of suitable bis(ether anhydrides) include: 2,2-bis(4-(3,4-dicarboxyphenoxy)phenyl)propane dianhydride; 4,4'-bis(3,4-dicarboxyphenoxy) diphenyl ether dianhydride. Illustrative examples of aromatic bis anhydrides include hydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxyl)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)4'-(3,4-dicarboxyphenoxyl)diphenyl ether dianhydride; 4-(2,3-dicarboxyphenoxy)4'-(3,4-dicarboxyphenoxyl)diphenyl sulfide dianhydride; 4-(2,3-dicarboxyphenoxy)-4'-(3,4-dicarboxyphenoxyl)benzophenone dianhydride; 4-(2,3-dicarboxyphenoxy)-4'-(3,4-dicarboxyphenoxyl)diphenyl sulfone dianhydride; and combinations thereof.

In general, any diamine compound may be employed for the synthesis of the polyetherimide fiber. Non-limiting examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethyipropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl)ether, bis(p-methyl-o-aminophenyl) benzene, bis(p-methyl-o-aminopentyl)benzene, 1,3-diamino-4-isopropylbenzene, bis(4-aminophenyl)sulfide, bis-(4-aminophenyl)sulfone, and bis(4-aminophenyl)ether. Mixtures of these compounds may also be used. In some embodiments the organic diamine comprises m-phenylenediamine, p-phenylenediamine, sulfonyl dianiline, or a combination comprising one or more of the foregoing.

Representative polyetherimides may include those described in U.S. Pat. Nos. 3,847,867; 4,650,850; 4,794,157; 4,855,391; 4,820,781; and, 4,816,527; as well as U.S. Patent Application Publication No. 2012/0107551, which are incorporated herein by reference.

The polyetherimide resin can have a weight average molecular weight (Mw) of about 500 to about 1,000,000 grams per mole (g/mole), in another embodiment a Mw of about 5,000 g/mole to about 500,000 g/mole, and yet in another embodiment from about 10,000 g/mole to about 75,000 g/mole as measured by gel permeation chromatography, using a polystyrene standard.

In another particular embodiment, the thermoplastic staple fiber can be a polycarbonate. More specifically, the polycarbonate can be an aromatic polycarbonate. The aromatic polycarbonate employed, according to an embodiment, can be prepared by reacting a dihydric phenol with a carbonate precursor. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2 hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl)ethane; 3,3-bis(4-hydroxyphenyl)pentane; 2,2-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dimethyl-4-hydroxyphenyl)propane; 2,4'-dihydroxydiphenyl sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether; 4,4-dihydroxy-2,5-diphenyl ether; and the like. Other dihydric phenols used in the preparation of the above polycarbonates are disclosed in U.S. Pat. Nos. 2,999,835; 3,038,365; 3,334,154; and 4,131,575, which are incorporated herein by reference.

Aromatic polycarbonates can be manufactured by known processes, such as, for example and as mentioned above, by reacting a dihydric phenol with a carbonate precursor, such as phosgene, in accordance with the methods set forth in, for example, U.S. Pat. No. 4,123,436, or by transesterification processes such as are disclosed in U.S. Pat. No. 3,153,008, both of which are incorporated herein by reference, as well as other processes known to those skilled in the art.

As noted above, it is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures. Branched polycarbonates are also useful, such as are described in U.S. Pat. No. 4,001,184, which is incorporated herein by reference. Also, there can be utilized blends of linear polycarbonate and a branched polycarbonate. Moreover, blends of any of the above materials may be employed to provide the aromatic polycarbonate. One aromatic carbonate is a homopolymer, e.g., a homopolymer derived from 2,2-bis(4-hydroxyphenyl)propane (bisphenol-A) and phosgene.

The staple fibers can have a staple length ranging from about 5 millimeters to about 75 millimeters, such as from about 10 millimeters to about 65 millimeters, such as from about 20 millimeters to about 55 millimeters. Further, the staple fibers can have a linear mass density ranging from about 0.25 denier to about 20 denier, such as from about 0.5 denier to about 15 denier, such as from about 0.75 denier to about 10 denier.

Regardless of the specific number and type of staple fibers utilized, the sheath of staple fibers can be present in an amount ranging from about 10 wt. % to about 50 wt. %, such as from about 15 wt. % to about 45 wt. %, such as from about 20 wt. % to about 40 wt. % based on the total weight of the yarn.

Types of Yarn Spinning

Figure 1:
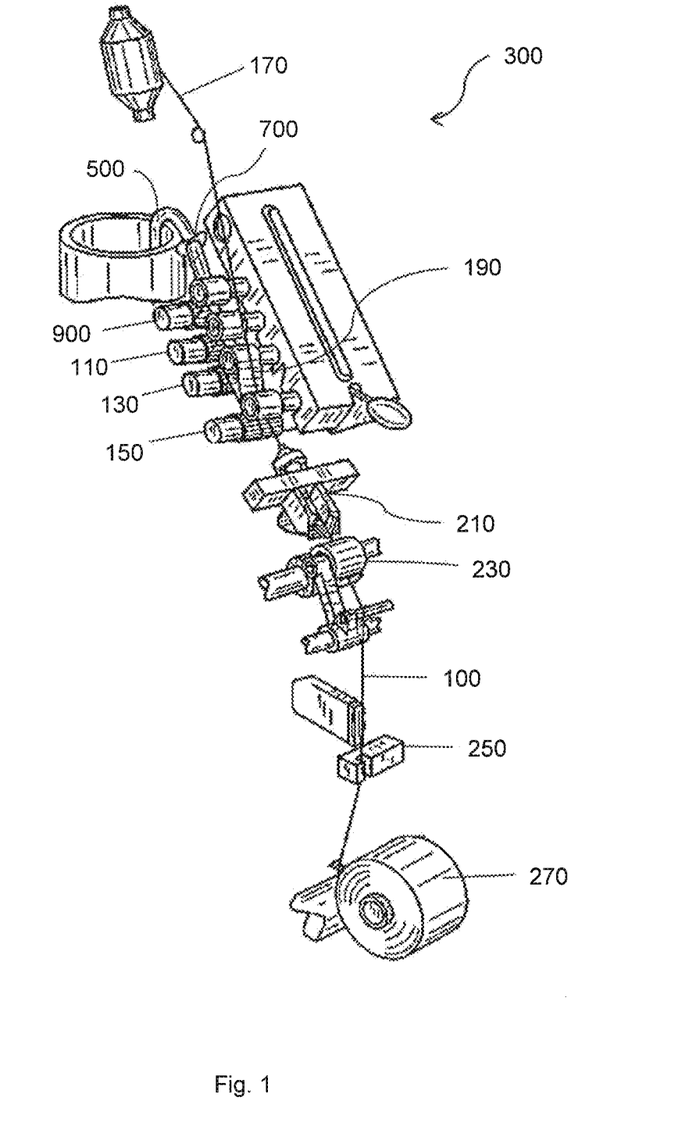
FIG. 1 is a schematic view of a standard commercially available air jet spinning machine for use in performing steps of preferred embodiments of the present method.
Figure 2:
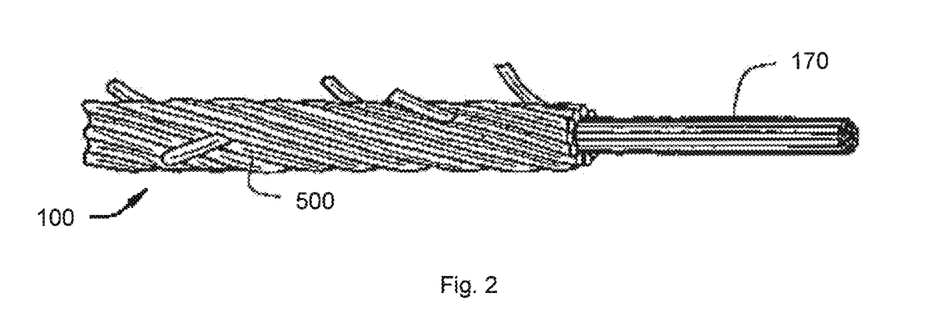
FIG. 2 is a view in side elevation, partially cut away, of the yarn produced by the machine of FIG. 1.

Referring now to the drawings, and in particular to FIGS. 1 and 2, in one embodiment, a form of an intermediate yarn 100 for use in various embodiments of the present disclosure is produced on a standard Murata Jet Spinning (MJS) or Murata Vortex Spinning (MVS) spinning frame 300. The spinning frame 300, as is well known in the art, includes a staple fiber 500 supply which feeds the staple fibers 500 through a trumpet 700, into a drafting zone. The staple fibers can be processed by a carding machine into a solid controllable and soft form. The drafting zone comprises a pair of back rolls 900, a pair of middle rolls 110, a pair of apron rolls 130, and a pair of front rolls 150. If desired, a guide or condenser may be included between the middle rolls 110 and apron rolls 130.

As shown in FIG. 1, the spinning frame 300 is set up with a standard core attachment for inclusion of a core. A continuous filament core yarn 170 is fed through a guide 190 into the spinning frame at the forward end of the drafting zone, at front rolls 150.

The front rolls 150 feed the continuous filament yarn 170 and drafted staple fibers into a spinning zone comprising spinning nozzles 210 and delivery rolls 230 which form the staple fibers 500 into a spun sheath surrounding and hiding the continuous filament core yarn 170 in accordance with well-known principles.

The completed corespun yarn 100 is passed through a yarn clearer 250 and rolled onto a core package 270.

The corespun yarn 1 which forms an intermediate yarn for use in the present invention is shown in FIG. 2. In such an embodiment, the staple fibers 500, and hence the spun sheath 500, of the yarn 100 are formed of a thermoplastic polymer as discussed above. Meanwhile, the continuous filament core can be formed of a multifilament bundle, such as a multifilament bundle of an inorganic material as discussed above. Such a process is described in U.S. Pat. No. 7,841,162, which is incorporated herein by reference.

In addition to contemplating yarns formed by core spinning, air jet spinning, or vortex spinning as described above, the present disclosure also contemplates yarns formed by ring spinning or friction spinning. In particular, ring spinning requires a separate winding process, which is used to consolidate the smaller ring spinning bobbins of the core spun yarn onto larger packages.

Ring spinning is a continuous process where a fiber bundle is first attenuated by using drawing rollers, then spun and wound around a rotating spindle which in its turn is contained within an independently rotating ring flyer. Ring spinning is generally described in U.S. Pat. No. 8,079,206, which is incorporated herein by reference.

Meanwhile, in friction spinning, individual fibers are transported by air currents and deposited in a spinning zone. The fibers assemble through a feed tube onto a core yarn core or filament(s) within the shear field, which is provided by two rotating spinning drums where the yarn core is disposed in between them. The shear causes the individual sheath fibers to wrap around the core yarn. Friction spinning is generally described in U.S. Pat. No. 4,107,909, which is incorporated herein by reference.

Regardless of the method by which the yarn of the present disclosure is spun, the resulting yarn can have a yarn weight of from about 1 cotton count (Ne) to about 20 Ne, such as from about 2.5 Ne to about 15 Ne, such as from about 5 Ne to about 10 Ne. The cotton count (Ne) refers to number of 840 yard lengths per pound of yarn.

Fabric Forming Process

Further, regardless of the manner by which the yarn of the present disclosure is spun, after spinning, the yarn can be formed into a fabric utilizing any suitable method known by one having ordinary skill in the art. For instance, the fabric can be woven, knitted, or braided. In one particular embodiment, the fabric can be in the form of a unidirectional tape. When in the form of a woven fabric, the weave of the woven fabric element may be a satin weave, such as a standard 8 harness satin weave, or any other suitable weave.

In an additional embodiment, prior to forming the yarn into a fabric, the yarn can be coated with a sizing. Sizing of the yarn helps to reduce breakage of the yarn. For instance, when a yarn is woven into a fabric using a weaving machine, the yarns are subjected to several types of actions (i.e., cyclic strain, flexing, abrasion) at various loom parts and inter yarn friction. By coating the sheath (e.g., staple fibers) of the yarn with a sizing, the abrasion resistance or strength of the yarn will improve. Different types of water soluble polymers called textile sizing agents/chemicals such as modified starch, polyvinyl alcohol (PVA), carboxymethyl cellulose (CMC), acrylates can be used to protect the yarn. Wax can also be added to reduce the abrasiveness of the yarn. In one particular embodiment of the present disclosure, the sizing agent can include PVA, which is cold water soluble. Regardless of the sizing used, the sizing can be applied in an amount ranging from about 0.5 wt. % to about 20 wt. %, such as from about 2 wt. % to about 15 wt. %, such as from about 5 wt. % to about 10 wt. % based on the total weight of the yarn. In some embodiments, to achieve the weight percent of sizing described above, in a woven fabric, the warp yarns were treated with the sizing while the weft yarns were left untreated. For instance, in one particular embodiment, the warp yarns can be treated with 10 wt. % size based on the weight of the warp yarns, where the warp yarns make up 51 wt. % of the fabric and the weft yarns make up 40 wt. % of the fabric, so that the wt. % of the sizing used based on the total weight of the yarns (warp and weft) was about 5.1 wt. %.

The sizing agent can optionally be removed by washing (desizing) after forming the yarn into a fabric if the sizing agent is not compatible with the resin in order to reduce contamination that may be associated with the sizing agent. However, it is also to be understood that desizing is not required, such as when the sizing agent is compatible with the resin used. Desizing generally involves treating the fabric with the desizing agent, allowing the desizing agent to degrade or solubilize the size material, and finally washing the fabric to remove the degradation products. Any suitable desizing process can be used. In particular, when certain types of PVA are used as the sizing agent, the fabric can be desized by rinsing in cold water. The water replaces the size on the outer surface of the yarn in the fabric, and absorbs within the yarn to displace any remaining size residue.

Regardless of the method by which the fabric of the present disclosure is formed, the resulting fabric can include from about 5 to about 80 ends/inch, such as from about 10 to about 70 ends/inch, such as from about 15 to about 60 ends/inch. In one embodiment, the fabric can include 57 ends/inch. Further, the resulting fabric can include from about 5 to about 78 picks/inch, such as from about 10 to about 68 picks/inch, such as from about 15 to about 58 picks/inch. In one particular embodiment, the fabric can include 54 picks/inch.

Further, the resulting fabric can have a basis weight ranging from about 10 grams per square meter (gsm) to about 500 gsm, such as from about 20 gsm to about 475 gsm, such as from about 30 gsm to about 450 gsm before desizing. Meanwhile, after desizing, the fabric can have a basis weight ranging from about 9 gsm to about 495 gsm, such as from about 18 gsm to about 465 gsm, such as from about 27 gsm to about 440 gsm. For instance, in one particular embodiment, a fabric having a basis weight of about 417 gsm can be made, where 10 wt. % of sizing is added on to the warp yarns, which make up 51 wt. % of the fabric, resulting in a fabric, including sizing, having a basis weight of about 438 gsm.

Composite Forming Process

Once a fabric or unidirectional tape is formed from the spun yarn of the present disclosure, in some embodiments, the fabric or unidirectional tape can be formed into a composite via the application of heat and pressure, although it is to be understood that the composite can also be formed via other methods, such as via vacuum forming, which generally requires that the fabric or unidirectional tape is preheated.

Figure 3:
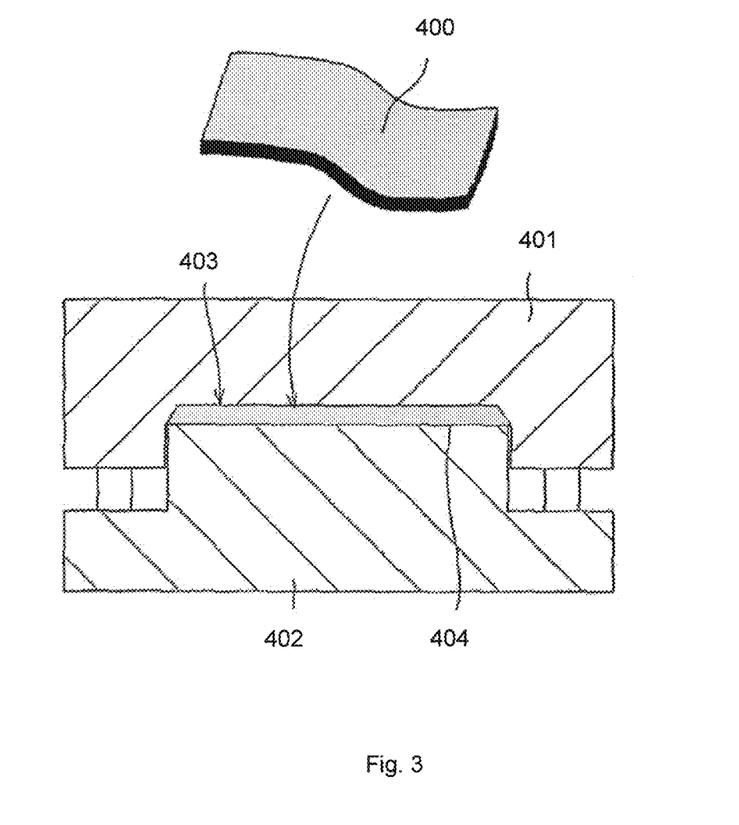
FIG. 3 shows a process for forming a two dimensional composite material as contemplated by the present disclosure.
Figure 4:
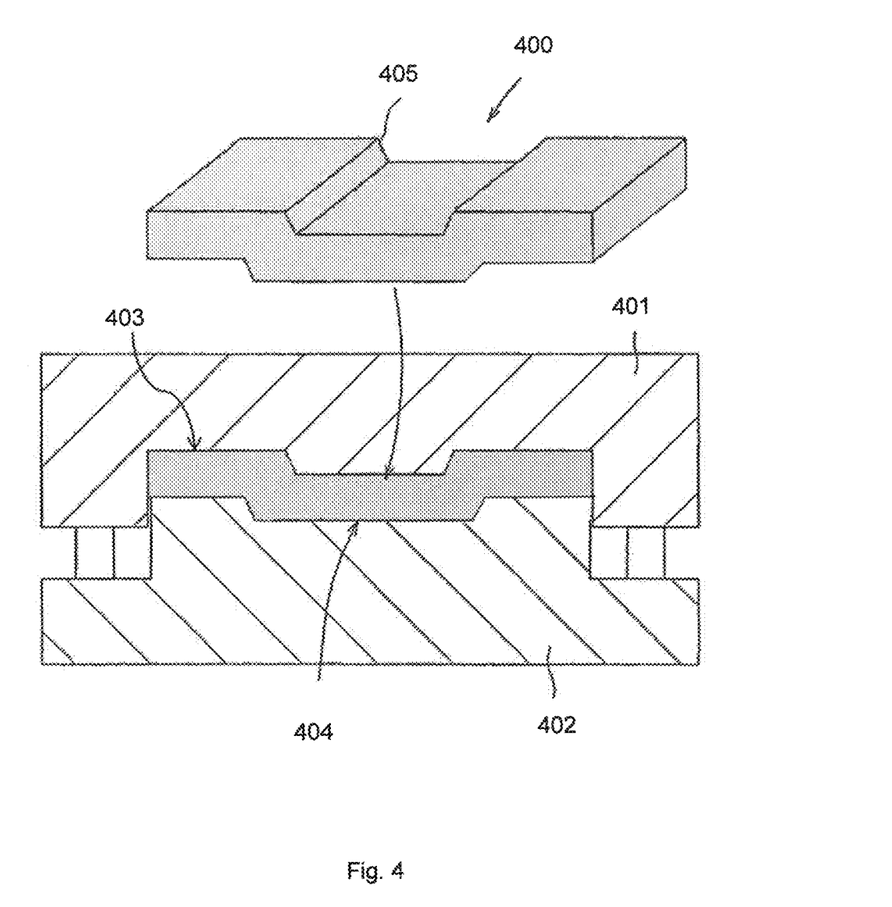
FIG. 4 shows a process for forming a three-dimensional composite material as contemplated by the present disclosure.

In one embodiment, the composite can be formed by placing the fabric between two flat portions of a mold, then applying heat and pressure to form a two-dimensional composite that is lightweight but has high strength. As shown in FIG. 3, a method for forming a thermoplastic composite material 404, according to one embodiment of the present disclosure, includes the steps of placing a fabric 400 in a cavity 403 formed by molds 401 and 402. The fabric 400 is then molded to form a composite 404 by heating the fabric 400 such that the temperature of the fabric 400 becomes higher than the melting point of the thermoplastic staple fibers that form the sheath of the yarn used to form the fabric 400. Further, as shown in FIG. 4, because the fabric has good drapability, the fabric can be placed in a three-dimensional mold, and the fabric can be formed into a shape having at least one fold 405 to render the composite material 404 three-dimensional after the application of heat and pressure. The fabric can be molded into a composite having any suitable shape. For instance, the molded composite can have one or more curves, bends, folds, or angles.

The temperature of the heat applied to the fabric to form the composite is higher than the melting temperature of the thermoplastic staple fibers. For instance, when polyetherimide is used as the thermoplastic polymer for the staple fibers, the heat applied can range from about 200° C. to about 400° C., such as from about 225° C. to about 375° C., such as from about 250° C. to about 350° C., depending on the particular grade of polyetherimide utilized. Meanwhile, when polycarbonate is used as the thermoplastic polymer for the staple fibers, the heat applied can range from about 100° C. to about 275° C., such as from about 125° C. to about 270° C., such as from about 150° C. to about 265° C.

Generally, internal pressures within the mold can range from about 50 psi to about 2000 psi, such as from about 60 psi to about 1500 psi, such as from about 70 psi to about 1250 psi. Further, the heat and pressure can be applied for a time frame ranging from about 10 seconds to about 180 minutes, such as from about 30 second to about 150 minutes, such as from about 1 minute to about 120 minutes, depending on the temperatures and pressures applied, as well as the thermoplastic polymer utilized.

When formed as described above, the composite of the present invention can exhibit a tensile strength of from about 120 MegaPascals (MPa) to about 500 MPa, such as from about 130 MPa to about 480 MPa, such as from about 140 MPa to about 460 MPa. Further, the composite of the present invention can exhibit a tensile modulus of from about 10 GigaPascals (GPa) to about 40 GPa, such as from about 12.5 GPa to about 35 GPa, such as from about 15 GPa to about 30 GPa. Additionally, the composite of the present invention can exhibit a compression strength of from about 30 MPa to about 600 MPa, such as from about 35 MPa to about 550 MPa, such as from about 40 MPa to about 500 MPa. In addition, the composite of the present invention can exhibit a compression modulus of from about 5 GPa to about 45

GPa, such as from about 7.5 GPa to about 40 GPa, such as from about 10 GPa to about 35 GPa. Further, the composite of the present invention can exhibit a shear strength of from about 30 MPa to about 100 MPa, such as from about 40 MPa to about 90 MPa, such as from about 50 MPa to about 80 MPa. Additionally, the composite of the present invention can exhibit a flexural strength of from about 120 MPa to about 700 MPa, such as from about 130 MPa to about 675 MPa, such as from about 140 MPa to about 650 MPa. In addition, the composite of the present invention can exhibit form by dissolving the polymer in solvent and then dipping the fabric in the resulting solution. For sample 3, the polymer was PEI, while for sample 4, the polymer was phenolic type thermoset resin. The polymer was present in an amount of 33 wt. % for samples 3-4. After forming each of the fabrics for Samples 1-4 of Example 1, a consolidation step was carried out at a specified temperature and pressure to form a composite material having the properties shown below in Table 1.

TABLE 1

| | | | | | Warp Tension | | | Warp Flex | |
| --- | --- | --- | --- | --- | --- | --- | --- | --- | --- |
| Sample | Polymer | Polymer Wt. % | Temp (° C.) | Pressure (psi) | Strength (MPa) | Modulus (GPa) | ±45° Tension Strength (MPa) | Strength (MPa) | Modulus (GPa) |
| 1 | PEI staple fibers | 34 | 330 | 435.1 | — | — | 68.9 | 467.5 | 24.1 |
| 2 | PEI staple fibers | 34 | 310 | 217.6 | — | — | 71.7 | 340.6 | 22.7 |
| 3 | PEI powder | 33 | 310 | 217.6 | 450.9 | 26.2 | 128.9 | 650.2 | 26.2 |
| 4 | Thermoset phenolic resin | 33 | — | — | 448.2 | 26.2 | 103.4 | 599.8 | 23.4 | a flexural modulus of from about 10 GPa to about 35 GPa, such as form about 15 GPa to about 30 GPa, such as from about 20 GPa to about 25 GPa.

The present invention may be better understood with reference to the following examples.

Example 1

In Example 1, samples 1-4 were tested for their tensile properties, in-plane shear properties, and flexural properties. As shown in Table 1, the warp tension properties (e.g., tensile strength and tensile modulus) were determined according to ASTM D3039 ("Standard Test Method for Tensile Properties of Polymer Matrix Composite Materials"), the ±45° laminate tensile properties (e.g., shear strength) were determined according to ASTM D3518 ("Standard Test Method for In-Plane Shear Response of Polymer Matrix Composite Materials by Tensile Test of a ±45° Laminate"), and the warp flexural properties (e.g., flexural strength and flexural modulus) were determined according to ASTM D790 ("Standard Test Methods for Flexural Properties of Unreinforced and Reinforced Plastics and Electrical Insulating Materials").

For samples 1-2, a spun yarn was formed that included a core of fiberglass continuous filaments and a sheath of polyetherimide (PEI) staple fibers. The fiberglass filaments each had a diameter of 6 microns, and the core included a bundle of 816 continuous filaments. The PEI staple fibers had a linear mass density of 2 denier per filament and a length of 2 inches (50.8 millimeters). The spun yarn included 34 wt. % staple fibers and 66 wt. % continuous filaments. The core of continuous filaments was coated with 0.3 wt. % of compatible binder. The core and sheath were spun into yarn on an MJS spinning system having a target yarn weight of 5.9 Ne. Then, the yarn was woven into a fabric, where the warp yarns only (51 wt. % of the total yarn) were treated with 10 wt. % of L1000 sizing, which was removed before consolidation. The fabric was an 8 harness satin weave fabric having a basis weight of 434 gsm before desizing. The fabric was 53 inches wide and included 57 ends/inch and 54 picks/inch.

For samples 3-4, a woven fiberglass fabric (type 7781, 8 harness satin weave) was coated with a polymer in powder As shown in samples 1-2, increasing the pressure when forming the composite material resulted in a higher flexural strength and modulus. Further, as shown, samples 1-2 have similar flexural moduli as compared to samples 3-4, but without requiring the use of solvents to form the samples.

Example 2

In Example 2, a spun yarn was formed that included a core of fiberglass continuous filaments and a sheath of polycarbonate staple fibers. The fiberglass filaments each had a diameter of 6 microns, and the core included a bundle of 816 continuous filaments. The polycarbonate staple fibers had a linear mass density of 2 denier per filament and a length of 2 inches (50.8 millimeters). The spun yarn included 33.4 wt. % staple fibers and 66.6 wt. % continuous filaments.

The core of continuous filaments was coated with 0.3 wt % of compatible binder. The core and sheath were spun into yarn on an MJS spinning system having a target yarn weight of 5.9 Ne. Then, the yarn was woven into a fabric, where the warp yarns only (51 wt. % of the total yarn) were treated with 10 wt. % of L1000 sizing. The fabric was an 8 harness satin weave fabric having a basis weight of 434 gsm before desizing. The fabric was 53 inches wide and included 57 ends/inch and 54 picks/inch. After forming the fabric in Example 2, a consolidation step was carried out to form a composite material.

Example 3

In Example 3, samples 1-10 were tested for their tensile properties, in-plane shear properties, and flexural properties. As shown in Table 2, the warp tension properties (e.g., tensile strength and tensile modulus) were determined according to ASTM D3039 ("Standard Test Method for Tensile Properties of Polymer Matrix Composite Materials"), the warp compression properties (e.g., compression strength and compression modulus) were determined according to ASTM D6641 ("Standard Test Method for Compressive Properties of Polymer Matrix Composite Materials Using a Combined Loading Compression (CLC) Test Fixture"), the ±45° laminate tensile properties (e.g., shear strength) were determined according to ASTM D3518 ("Standard Test Method for In-Plane Shear Response of Polymer Matrix Composite Materials by Tensile Test of a ±45° Laminate"), and the warp flexural properties (e.g., flexural strength and flexural modulus) were determined according to ASTM D790 ("Standard Test Methods for Flexural Properties of Unreinforced and Reinforced Plastics and Electrical Insulating Materials").

For sample 1, a woven fiberglass fabric (type 7781, 8 harness satin weave) was coated with polyetherimide (PEI) in powder form by dissolving the polymer in solvent and then dipping the fabric in the resulting solution. The fiberglass filaments in the fabric each had a diameter of 6 microns, and the core included a bundle of 816 continuous filaments. The PEI was present in an amount of 33 wt. %, while the fiberglass was present in an amount of 67 wt. %.

For samples 2-6, a spun yarn was formed that included a core of fiberglass continuous filaments and a sheath of polyetherimide (PEI) staple fibers. The fiberglass filaments each had a diameter of 6 microns, and the core included a bundle of 816 continuous filaments. The PEI staple fibers had a linear mass density of 2 denier per filament and a length of 2 inches (50.8 millimeters). The spun yarn included 34 wt. % staple fibers and 66 wt. % continuous filaments. The core of continuous filaments was coated with 0.3 wt. % of compatible binder. The core and sheath were spun into yarn on an MJS spinning system having a target yarn weight of 5.9 Ne. Then, the yarn was woven into a fabric, where the warp yarns only (51 wt. % of the total yarn) were treated with 10 wt. % of L1000 sizing, which was removed before consolidation. The fabric was an 8 harness satin weave fabric having a basis weight of 434 gsm before desizing. The fabric was 53 inches wide and included 57 ends/inch and 54 picks/inch.

For sample 7, a woven fiberglass fabric (type 7581, 8 harness satin weave) was coated with polycarbonate in powder form by dissolving the polymer in solvent and then dipping the fabric in the resulting solution. The fiberglass filaments in the fabric each had a diameter of 9 microns, and the core included a bundle of 408 continuous filaments. The polycarbonate was present in an amount of 34 wt. %, while the fiberglass was present in an amount of 66 wt. %.

For sample 8, a spun yarn was formed that included a core of fiberglass continuous filaments and a sheath of polycarbonate staple fibers. The fiberglass filaments each had a diameter of 6 microns, and the core included a bundle of 816 continuous filaments. The polycarbonate staple fibers had a linear mass density of 2 denier per filament and a length of 2 inches (50.8 millimeters). The spun yarn included 34 wt. % staple fibers and 66 wt. % continuous filaments. The core of continuous filaments was coated with 0.3 wt. % of compatible binder. The core and sheath were spun into yarn on an MJS spinning system having a target yarn weight of 5.9 Ne. Then, the yarn was woven into a fabric, where the warp yarns only (51 wt. % of the total yarn) were treated with 10 wt. % of L1000 sizing, which was removed before consolidation. The fabric was an 8 harness satin weave fabric having a basis weight of 434 gsm before desizing. The fabric was 53 inches wide and included 57 ends/inch and 54 picks/inch.

For samples 9-10, a spun yarn was formed that included a core of fiberglass continuous filaments and a sheath of polyethylene terephthalate (PET) fibers. The fiberglass filaments each had a diameter of 7 microns, and the core included a bundle of 204 continuous filaments. The PET yarn had a linear mass density of 1.2 denier per filament and a length of 1.5 inches (38.1 millimeters). The spun yarn included 60 wt. % PET yarn and 40 wt. % continuous fiberglass filaments. The core of continuous filaments was coated with 1.5 wt. % of non-compatible binder. The core and sheath were spun into yarn on an MJS spinning system having a target yarn weight of 11 Ne. Then, the yarn was woven into a fabric, where the warp yarns only (61 wt. % of the total yarn) were treated with 6 wt. % of predominately PVOH sizing, which was not removed before consolidation. The fabric was a 2×1 twill and had a basis weight of 237 gsm before desizing. The fabric was 78 inches wide and included 66 ends/inch and 42 picks/inch.

For each of the samples 1-10 in Example 3, after forming each of the fabrics, a consolidation step was carried out for a specified period of time and at a specified temperature and pressure to form a composite material having the properties shown below in Table 2.

TABLE 2

| Sample | Polymer | Layers | Ply Thickness (mm) | Polymer Wt. % | Time (minutes) | Temp (° C.) | Pressure (psi) | Warp Tension Strength (MPa) | Warp Tension Modulus (GPa) | Warp Compression Strength (MPa) | Warp Compression Modulus (GPa) | ±45° Tension Strength (MPa) | Warp Flex Strength (MPa) | Warp Flex Modulus (GPa) |
|---|---|---|---|---|---|---|---|---|---|---|---|---|---|---|
| 1 | PEI powder | — | — | 33 | 20 | 325 | 290.1 | 450.9 | 26.2 | 723.9 | 29.0 | 128.9 | 650.2 | 26.2 |
| 2 | PEI staple fibers | 12 | 2.8 | 34 | 30 | 330 | 435.1 | 354.4 | 21.9 | 329.1 | 30.4 | 68.9 | 467.5 | 24.1 |
| 3 | PEI staple fibers | 12 | 2.7 | 34 | 30 | 310 | 217.6 | 342.1 | 19.8 | 201.9 | 27.2 | 71.7 | 340.6 | 22.7 |
| 4 | PEI staple fibers | 12 | 2.8 | 34 | 30 | 310 | 652.7 | 362.5 | 21.4 | 254.6 | 26.5 | — | 427.5 | 23.9 |
| 5 | PEI staple fibers | 12 | 2.2 | 34 | 120 | 330 | 652.7 | 440.6 | 27.6 | 440.6 | 31.6 | — | 634.3 | 30.3 |
| 6 | PEI staple fibers | 12 | 2.8 | 34 | 30 | 330 | 435.1 | 372.3 | 23.7 | 423.3 | 26.1 | — | 530.9 | 23.4 |
| 7 | Polycarbonate powder | — | 8.1 | 34 | — | — | — | 461.9 | 23.4 | 448.2 | 26.1 | — | 730.8 | 26.2 |
| 8 | Polycarbonate staple fibers | 12 | — | 34 | 30 | 260 | 290.1 | 353 | 21.7 | 213.7 | 26.9 | — | 342.7 | 21.4 |
| 9 | Polyethylene terephtahlate fibers | 20 | 0.12 | 80 | — | — | — | — | — | 40.87 | 6.79 | — | — | — |

TABLE 2-continued

| Sample | Polymer | Layers | Ply Thickness (mm) | Polymer Wt. % | Time (minutes) | Temp (° C.) | Pressure (psi) | Warp Tension Strength (MPa) | Warp Tension Modulus (GPa) | Warp Compression Strength (MPa) | Warp Compression Modulus (GPa) | ±45° Tension Strength (MPa) | Warp Flex Strength (MPa) | Warp Flex Modulus (GPa) |
|---|---|---|---|---|---|---|---|---|---|---|---|---|---|---|
| 10 | Polyethylene terephtahlate fibers | 12 | 0.11 | 80 | — | — | — | 143.7 | 15.2 | — | — | — | 142.2 | 15.6 |

As shown from a comparison of samples 2-6 in Example 3, increasing the time, temperature, and pressure used to form the PEI thermoplastic composite material when forming the composite material generally results in a higher tensile strength and modulus, a higher compression strength and modulus, and a higher flexural strength and modulus. Further, as shown, PEI staple fiber samples 2-6 have similar tensile, warp, and flexural moduli as compared to PEI powder sample 1, but without requiring the use of solvents to form samples 2-6. In addition, as shown from a comparison of samples 7 and 8, polycarbonate staple fiber sample 8 has similar tensile, warp, and flexural moduli as compared to polycarbonate powder sample 7, but without requiring the use of solvents to form sample 8. The ability to form fiberglass and PET thermoplastic composite materials was also demonstrated, as shown by samples 9 and 10.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalent thereto.

What is claimed is:

1. A spun yarn comprising:
   a core, wherein the core comprises from about 50 wt. % to about 90 wt. % of the spun yarn based on the total weight of the spun yarn; and
   a sheath, wherein the sheath comprises from about 10 wt. % to about 50 wt % of the spun yarn based on the total weight of the spun yarn;
   wherein the core comprises continuous filaments of an inorganic material and the sheath comprises staple fibers of a thermoplastic polymer, wherein the continuous filaments are coated with a binder, wherein the binder is present in an amount ranging from about 0.1 wt. % to about 5 wt. % based on the total weight of the yarn, and wherein the thermoplastic polymer comprises polyetherimide, polycarbonate, polyphenylene sulfide, polyethersulfone, polyetherketoneketone, polyetheretherketone, or a combination thereof.

2. The spun yarn of claim 1, wherein the inorganic material comprises fiberglass, carbon, ceramic, quartz, or a combination thereof.

3. The spun yarn of claim 1, wherein the staple fibers have a length ranging from about 10 millimeters to about 75 millimeters.

4. The spun yarn of claim 1, wherein the yarn is core spun, ring spun, air jet spun, friction spun, or vortex spun.

5. A fabric or unidirectional tape comprising the spun yarn of claim 1.

6. A method for forming a spun yarn, the method comprising:
   introducing a core of continuous filaments into a yarn spinning apparatus, wherein the filaments comprise an inorganic material, wherein the continuous filaments are coated with a binder, wherein the binder is present in an amount ranging from about 0.1 wt. % to about 5 wt. % based on the total weight of the yarn; and
   introducing staple fibers into the yarn spinning apparatus, wherein the staple fibers comprise a thermoplastic polymer, wherein the thermoplastic polymer comprises polyetherimide, polycarbonate, polyphenylene sulfide, polyethersulfone, polyetherketoneketone, polyetheretherketone, or a combination thereof; and
   forming a sheath around the core of continuous filaments, wherein the yarn spinning apparatus causes the staple fibers to wrap around the core of continuous filaments to form the sheath, wherein the core constitutes from about 50 wt. % to about 90 wt. % of the spun yarn and the sheath constitutes from about 10 wt. % to about 50 wt. % of the spun yarn based on the total weight of the spun yarn.

7. The method of claim 6, wherein the inorganic material comprises fiberglass, carbon, ceramic, quartz, or a combination thereof.

8. The method of claim 6, wherein the wherein the spun yarn is core spun, ring spun, air jet spun, friction spun, or vortex spun.

9. The spun yarn of claim 1, wherein the binder is capable of withstanding temperatures of up to about 400° C. without degrading.

* * * * *